US009449598B1

(12) United States Patent
Rastrow et al.

(10) Patent No.: US 9,449,598 B1
(45) Date of Patent: Sep. 20, 2016

(54) SPEECH RECOGNITION WITH COMBINED GRAMMAR AND STATISTICAL LANGUAGE MODELS

(71) Applicant: Amazon Technologies, Inc., Reno, NV (US)

(72) Inventors: Ariya Rastrow, Seattle, WA (US);
Bjorn Hoffmeister, Seattle, WA (US);
Sri Venkata Surya Siva Rama Krishna Garimella, Seattle, WA (US);
Rohit Krishna Prasad, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 14/037,975

(22) Filed: Sep. 26, 2013

(51) Int. Cl.
*G10L 15/00* (2013.01)
*G10L 15/18* (2013.01)
*G10L 15/02* (2006.01)
*G06F 17/20* (2006.01)
*G06F 17/27* (2006.01)
*G10L 15/193* (2013.01)
*G10L 15/197* (2013.01)

(52) U.S. Cl.
CPC ............... *G10L 15/02* (2013.01); *G06F 17/20* (2013.01); *G06F 17/271* (2013.01); *G06F 17/2715* (2013.01); *G10L 15/193* (2013.01); *G10L 15/197* (2013.01)

(58) Field of Classification Search
CPC ... G10L 15/197; G10L 15/142; G10L 15/14; G10L 15/193; G06F 17/2715; G06F 17/271

USPC .......... 704/E15.021, E15.022, E15.024, 704/E15.027, E15.028, E15.029, E15.03, 704/E15.031, E15.032, E15.033
See application file for complete search history.

(56) References Cited

U.S. PATENT DOCUMENTS

| 5,621,859 | A  | * | 4/1997  | Schwartz et al. ............. 704/256 |
| 6,154,722 | A  | * | 11/2000 | Bellegarda .................... 704/257 |
| 7,529,657 | B2 | * | 5/2009  | Wang et al. ............ G06F 17/27 454/74 |
| 7,542,907 | B2 | * | 6/2009  | Epstein et al. ........ G10L 15/183 704/251 |
| 7,805,305 | B2 | * | 9/2010  | Badt et al. .................... 704/257 |
| 2002/0052743 | A1 | * | 5/2002  | Schmid et al. ............... 704/257 |
| 2004/0220809 | A1 | * | 11/2004 | Wang et al. .................. 704/257 |
| 2005/0137868 | A1 | * | 6/2005  | Epstein et al. ........ G10L 15/183 704/252 |
| 2008/0270135 | A1 | * | 10/2008 | Goel et al. .................... 704/257 |
| 2009/0048839 | A1 | * | 2/2009  | Sakai ............................. 704/257 |
| 2010/0241418 | A1 | * | 9/2010  | Maeda et al. ..................... 704/9 |

* cited by examiner

*Primary Examiner* — Richard Zhu
(74) *Attorney, Agent, or Firm* — Knobbe, Martens, Olson & Bear, LLP

(57) ABSTRACT

Features are disclosed for performing speech recognition on utterances using a grammar and a statistical language model, such as an n-gram model. States of the grammar may correspond to states of the statistical language model. Speech recognition may be initiated using the grammar. At a given state of the grammar, speech recognition may continue at a corresponding state of the statistical language model. Speech recognition may continue using the grammar in parallel with the statistical language model, or it may continue using the statistical language model exclusively. Scores associated with the correspondences between states (e.g., backoff arcs) may be determined according to a heuristically or based on test data.

24 Claims, 5 Drawing Sheets

SPEECH RECOGNITION WITH COMBINED GRAMMAR AND STATISTICAL LANGUAGE MODELS

BACKGROUND

Natural language processing systems include various modules and components for receiving input from a user (e.g., audio, text, etc.) and determining what the user meant. In some implementations, a natural language processing system includes an automatic speech recognition ("ASR") module that receives audio input of a user utterance and generates one or more likely transcriptions of the utterance. Automatic speech recognition modules typically include an acoustic model and a language model. The acoustic model is used to generate hypotheses regarding which subword units (e.g. phonemes or triphones) correspond to an utterance based on the acoustic features of the utterance. The language model is used to determine the most likely transcription of the utterance based on the hypotheses generated using the acoustic model and lexical features of the language in which the utterance is spoken.

Automatic speech recognition systems may use different types of language models to obtain different benefits. For example, a grammar-only language model includes a number of pre-defined combinations of words, such as sentences. User utterances that correspond to one of the sentences in the grammar-only language model may be quickly and accurately recognized due to the limited search space. As another example, a statistical language model may include a large vocabulary, and the words may be recognized in any combination. User utterances that include sequences of words not known ahead of time may still be accurately recognized due to the expansive search space.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
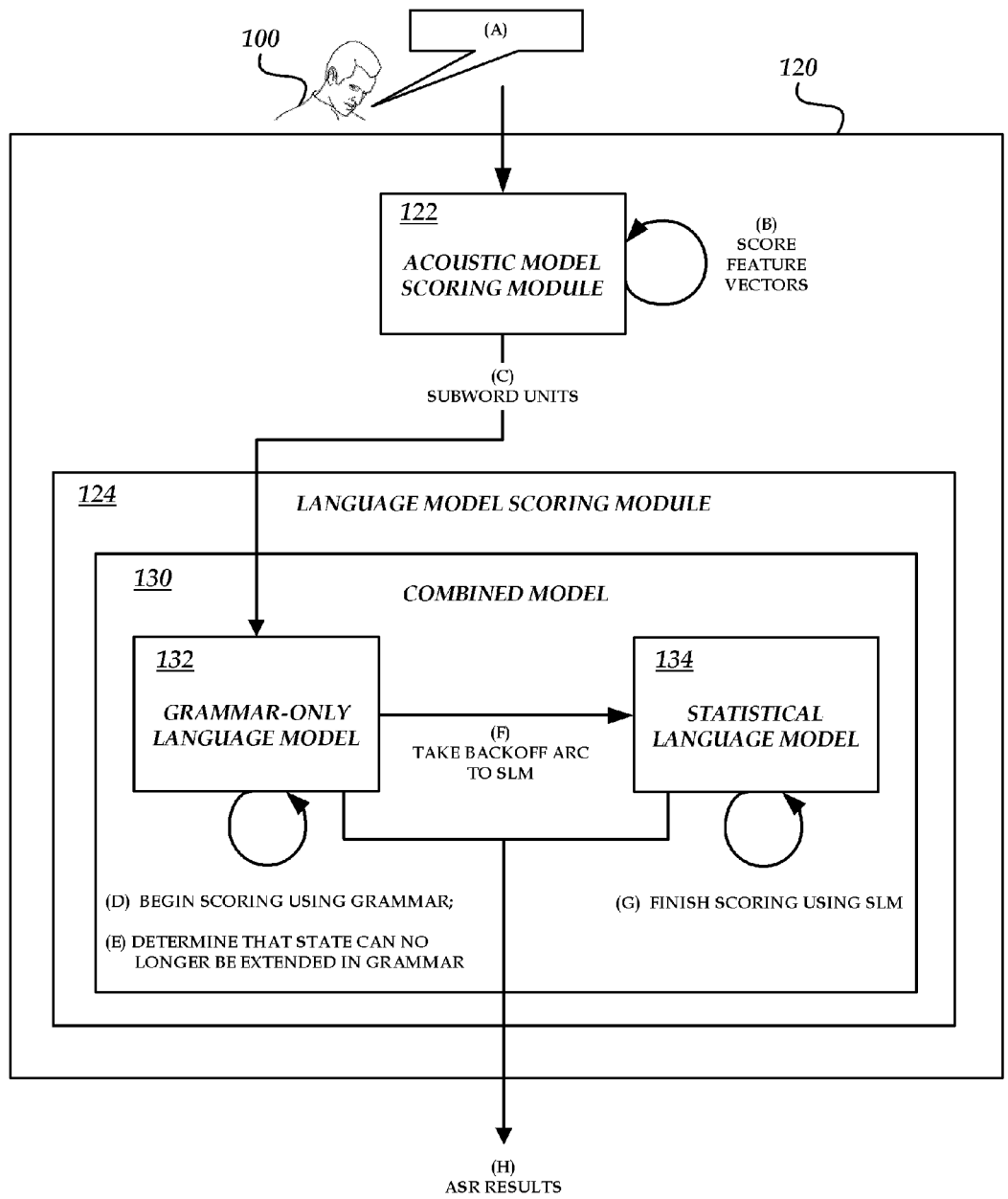
FIG. 1 is a block diagram of illustrative data flows in an automatic speech recognition module for using a combined language model to generate automatic speech recognition results.

Automatic speech recognition ("ASR") systems use language models to generate transcriptions of user utterances. Words or subword units (e.g., phonemes) identified by scoring audio of a user utterance with an acoustic model can be subsequently processed using a language model to generate one or more likely transcriptions of the utterance. From the perspective of a user, the perceived performance of an ASR system may be defined in terms of its accuracy and performance latency. Different types of language models each have their own performance benefits and drawbacks. Grammar-only language models (also referred to simply as "grammars") include a predefined set of possible word combinations, typically targeting a particular domain (e.g., command and control applications, such as voice commands in cars, hands-free dialing of a mobile phone, etc.). Due to the specific domain and predefined set of word combinations, grammars can produce results very fast when a user utters one of the predefined word combinations. Another advantage of using grammars is that they can provide speech recognition grammar specification ("SRGS") tags which can aid natural language understanding ("NLU") or, in some cases, eliminate the need to do NLU processing. However, if a user deviates from the predefined set of word combinations, the utterance will not be recognized. Therefore, generating an inclusive grammar that covers substantially all expected utterance variations can be extremely time consuming and difficult. Statistical language models ("SLMs") include a vocabulary that is typically much larger than a grammar. In addition, the words in the vocabulary may be spoken in virtually any combination, and they will still be recognized with a satisfactory degree of accuracy. However, due to their expansive search space, ASR performance with an SLM is typically slower than ASR performance on the same utterance using a grammar-only language model. In addition, due to acoustic confusions in noisy environments and the availability of alternate paths, SLMs tend to be less accurate for the in-grammar spoken utterances.

Aspects of the present disclosure relate to using grammars in conjunction with SLMs. The benefits of using a combination of both types of models to process a single utterance may mitigate or eliminate the drawbacks of using each type of language model separately. In some embodiments, a grammar may be developed to target a particular domain. At each state of the grammar (or some subset thereof), a link to a corresponding state in an SLM may be created. The link may be referred to as a "backoff arc." The linked models may form a single combined language model, or they may remain separate models that are logically linked by data representing the backoff arcs. An ASR system may initially process a user utterance with the grammar portion of the combined model. So long as the utterance stays within one of the predefined paths of the grammar, the benefits of the grammar may continue to be realized. However, when the ASR system encounters a portion of the utterance that does not allow it to extend a path of the grammar, it can use the backoff arc for the current grammar state to switch to the SLM at a corresponding state. Recognition may continue using the SLM in order to produce satisfactory results for utterances that deviate from the predefined grammar. In cases where the user utterance corresponds to a sequence of words in the grammar, recognition may be performed entirely using the grammar. As a result, the benefits of the grammar (fast recognition of known word sequences) can be combined with the benefits of the SLM (accurate recognition of utterances that deviate from lengthy, predefined word sequences). This allows developers of language models for ASR systems to produce grammars which cover a large percentage of the expected word sequences, without the additional effort of exhaustively covering the many possible variations. When a user deviates from one of the expected word sequences, the SLM can be used to accurately recognize the utterance.

Additional aspects of the present disclosure relate to determining scores (e.g., probability scores) for the backoff arcs so that ASR systems may determine when to follow a backoff arc during speech recognition. In some embodiments, the probability associated with a backoff arc may correspond directly to the number of branches from the grammar state. For example, a given state in a grammar may have a large number of branches, corresponding to a large number of different words which may come next in the word sequence. The probability assigned to the backoff arc for that state may be small due to the robustness of the grammar at that particular state and the preference for performing speech recognition using a grammar for performance reasons. In contrast, if the number of branches from a given state in a grammar is small, the probability assigned to the backoff arc for that state may be larger to improve recognition robustness. In some embodiments, a data-driven approach may be used to determine probabilities for backoff arcs, rather than the heuristic approach described above. For example, prior probability distributions may be determined for the grammar, similar to the distributions for the SLM. In order to combine the two different probability distributions, the distributions may be interpolated at each state of the grammar (or some subset thereof). Interpolation may be performed to optimize some parameter, such as perplexity or word error rate ("WER"), with respect to a corpus of test data. The interpolation weights may be used to determine backoff probabilities. For example, each state may be associated with its own interpolation weights, and the interpolations weights or some number derived therefrom may be used as the backoff probabilities.

Although aspects of the embodiments described in the disclosure will focus, for the purpose of illustration, on combining grammar-only language models with n-gram language models, one skilled in the art will appreciate that the techniques disclosed herein may be applied to any number of processes or applications performing automatic speech recognition. For example, grammar-only language models may be combined with other types of language models, such as any language model that can be represented by finite state automata, to achieve some of the benefits described herein. In some embodiments, grammars may be used with other language models (including language models that are not represented by finite state automata) by applying backoff arcs at run time. For example, a corresponding context state can be detected in a statistical language model, and a backoff arc from the grammar state can be taken to the context state of the SLM. The language model score from that point would be fully determined by the SLM. Various aspects of the disclosure will now be described with regard to certain examples and embodiments, which are intended to illustrate but not limit the disclosure.

With reference to an illustrative embodiment, FIG. 1 shows example interactions and data flows between various ASR modules in response to receipt of a user utterance. At (A), a user makes an utterance. For example, the utterance may include a spoken command for a computing system to perform some task, a query, a statement to be dictated, etc. The utterance may be provided to an ASR module 120 for processing. In some embodiments, the ASR module 120 may be a stand-alone system for providing speech recognition functionality. In some embodiments, the ASR module 120 may be part of a spoken language processing system. An example spoken language processing system is described in greater detail below with respect to FIG. 2.

Advantageously, the ASR module 120 can use a combined language model that incorporates both a grammar-only language model and a statistical language model to perform speech recognition on an utterance. Use of such a combined model can provide fast and accurate results when an utterance is one of the predefined options of the grammar. The combined model can also provide accurate results when a user deviates from the predefined options in the grammar and uses words or phrases, or sentences outside of the grammar's search space.

Audio data of the utterance may be provided to an acoustic model scoring module 122 of the ASR module 120. The acoustic model scoring module 122 may extract features from the audio data to generate feature vectors for portions (e.g., frames) of the audio data, and use an acoustic model to score the feature vectors and determine which words or subword units (e.g., phonemes, triphones) were likely spoken by the user. The output from the acoustic model scoring module 122 is provided to a language model scoring module 124 at (C).

As shown in FIG. 1, the language model scoring module 124 can include or otherwise use a combined language model 130. The combined language model 130 includes a grammar-only language model 132 and a statistical language model 134, such as an n-gram model. The grammar 132 and SLM 134 may be linked by various backoff arcs, as described in greater detail below. The combination of the grammar 132 and SLM 134 may be physical (e.g., the models are linked and stored together in a single data object or group of data objects, such as files) or logical (e.g., the models remain in physically separate data objects, and data regarding the links between the models may be stored with either model, both models, or in yet another separate data object). In some embodiments, the process of combining language models can be performed at run time, during the recognition process.

Figure 4:
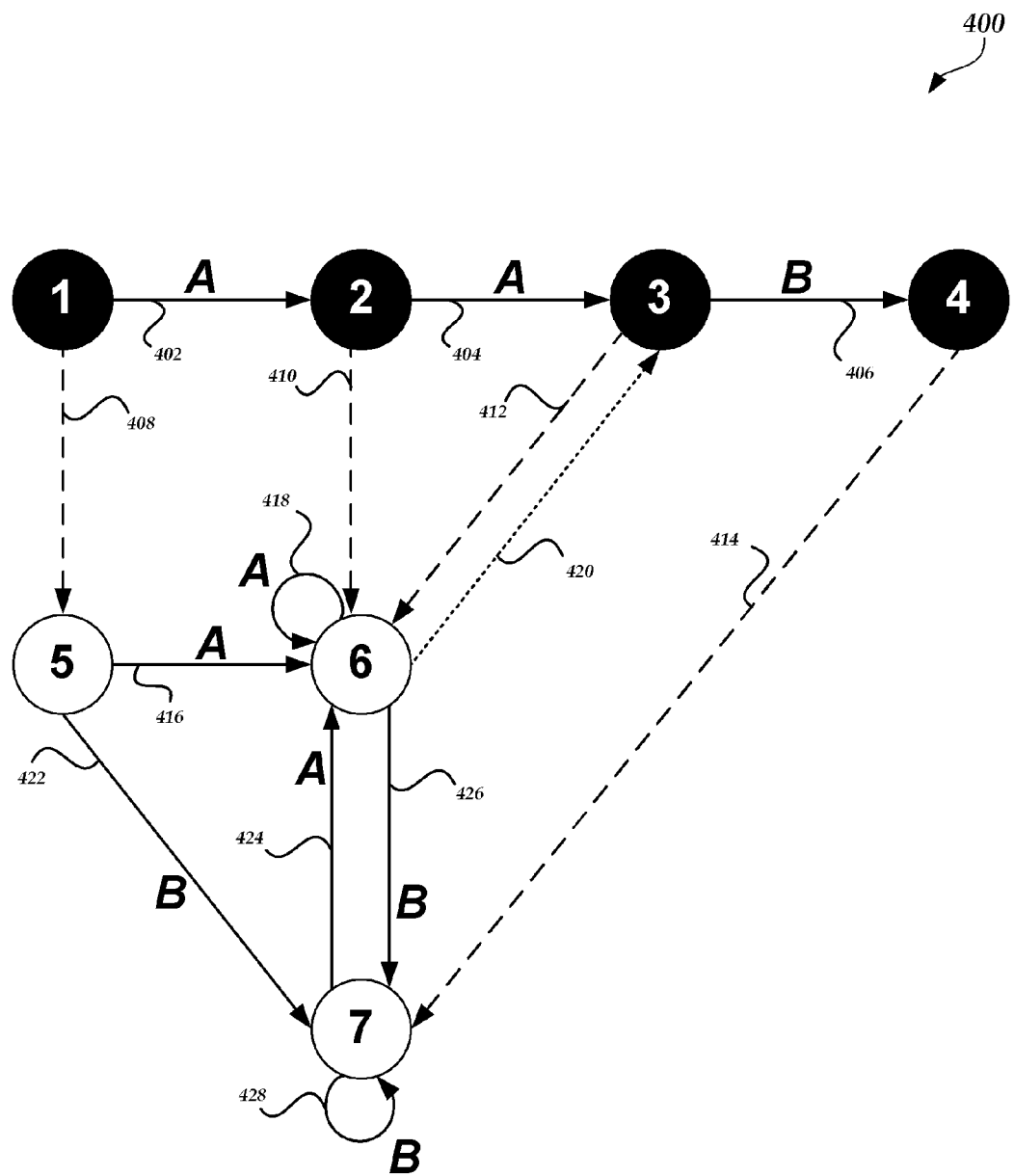
FIG. 4 is a conceptual diagram of a combined grammar and statistical language model showing back-off arcs from the grammar states to corresponding statistical language model states.

Generally described, a grammar 132 can include any number of states. Each state can represent the current progress of speech recognition. For example, each state may be associated with some history, such as the sequence of words that has been recognized thus far in connection with the current utterance (or no history for an initial state of a grammar). One or more branches may extend from a state, representing the possible words that may be recognized next. Recognition may extend from a given state to only the predefined subset of states in the grammar that may be reached via a branch from the given state. Any word other than those associated with the branches will not be recognized correctly, and recognition of the utterance may fail. FIG. 4, described in greater detail below, shows several states 1, 2, 3 and 4 of a grammar. The paths 402, 404 and 406 extending between the states represent specific words of a predefined sequence that the grammar is configured to recognize (represented as "AAB" in the illustrated example). Acoustic evidence from the acoustic model scoring module 122 is used to determine which branch, if any, to follow during recognition of a given utterance. Deviation from the subset of words for which a predefined branch exists will result in a failure to successfully recognize the utterance. One of the benefits of grammars is that confusable words which are not part of the grammar or which do not branch off of a given state in the grammar are not recognized at that point in a sequence. Therefore, any utterance which acoustically resembles one of the predefined paths through the grammar can be efficiently recognized even if it may be confusable with some other utterance. Grammars are well-known to those of skill in the art, and specific implementation details that are not relevant to combining grammars with other models are not described further herein.

An SLM 134 can also include any number of states. Like grammars, each state may represent some amount of progress, or history, during speech recognition. In contrast to grammars, however, SLMs such as n-gram language models do not include a limited number of predefined paths through the states of the model. Rather, each state may be reached from, or extend to, each other state in the SLM. As a result, many more sequences of words can be recognized, so long as the SLM vocabulary includes each word of the sequence to be recognized. A prior probability distribution may be developed from training data. As a result, the probability that any word in the SLM's vocabulary will follow a given word is known ahead of time. FIG. 4 shows several states 1, 5, 6 of an SLM. After the initial state (1 in this case), each state may be reached from each other state. As a result, deviation from predefined paths, which prevents accurate recognition results when using grammars, does not happen in SLMs. Acoustic evidence from the acoustic model scoring module 122 and prior probabilities associated with the branches are used to determine the likely sequence of words in the utterance. However, because each state may be reached from each other state, and because the vocabulary may be large, the total search space tends to be large. As a result, speech recognition with SLM models may take longer (in some cases substantially longer) than speech recognition with a grammar.

The combined model shown in FIG. 1 includes links, or backoff arcs, between the grammar 132 and the SLM 134. In some embodiments, each state of the grammar 132 may include a backoff arc to a corresponding state (e.g., a state with a similar history) in the SLM 134. When the acoustic evidence from the acoustic model scoring module 122 does not support following any branch from a state in the grammar model, the backoff arc from the state may be taken, and speech recognition may continue using the SLM 134.

Speech recognition may be initially performed at (D) using the grammar 132. In the present example, the utterance may be "Give me directions to 555 Main Street." The grammar 132 may include various predefined word sequences related to asking for directions, including asking for directions to labeled locations such as "home" or "work" (e.g., the grammar may include the predefined sequence "Give me directions to work."). When the language model scoring module 124 uses the combined model 130 to recognize the utterance, it may proceed from state to state in the grammar 132, reaching a state with a history of "Give me directions to." At (E), the language model scoring module 124 may determine that the acoustic evidence obtained from the acoustic model scoring module 122 (e.g., corresponding to the words "five five five" in the phrase "555 Main Street") does not support proceeding to any subsequent state of the grammar 132 via one of the branches from the current state. However, because the grammar 132 is combined with the SLM 134, there is backoff arc from the current state in the grammar 132 to a corresponding state in the SLM 134. For example, the corresponding state in the SLM 134 may be arrived at via the word "to," the sequence of two words "directions to," the sequence of three words "me directions to," etc., depending on the order of the SLM and whether those sequences of words are represented as explicit context states in the SLM or not. The language model scoring module 124 may take the backoff arc at (F).

The language model scoring module 124 can proceed with speech recognition using the SLM at (G). The results obtained using the SLM 134 ("five five five main street") can be combined with the results obtained using the grammar 132 ("give me directions to"). The language model scoring module 128 can provide the ASR results to some other module, process or system at (H).

The example process described above and shown in FIG. 1 is illustrative only, and is not intended to be limiting. Other processes may be used to perform speech recognition using a combined language model, as described in detail below. In some embodiments, speech recognition does not necessarily proceed state-by-state in a grammar and switch to an SLM when the grammar states can no longer be extended. Rather, the backoff arc associated with each grammar state may always be followed, and recognition may proceed in parallel using both the grammar and the SLM as reached from each grammar state. This can lead to a large number of parallel or separate recognition processes, each producing different results that may be more or less likely relative to each other. The language model scoring module 124 may select the most probable or likely results to include with the output at (H) (e.g., a lattice or n-best list). In some embodiments, backoff arcs to corresponding states in the SLM may be selectively taken based on some parameter, such as the probability that the grammar will produce incorrect results or the probability that the SLM will produce correct results.

Spoken Language Processing System Environment

Figure 2:
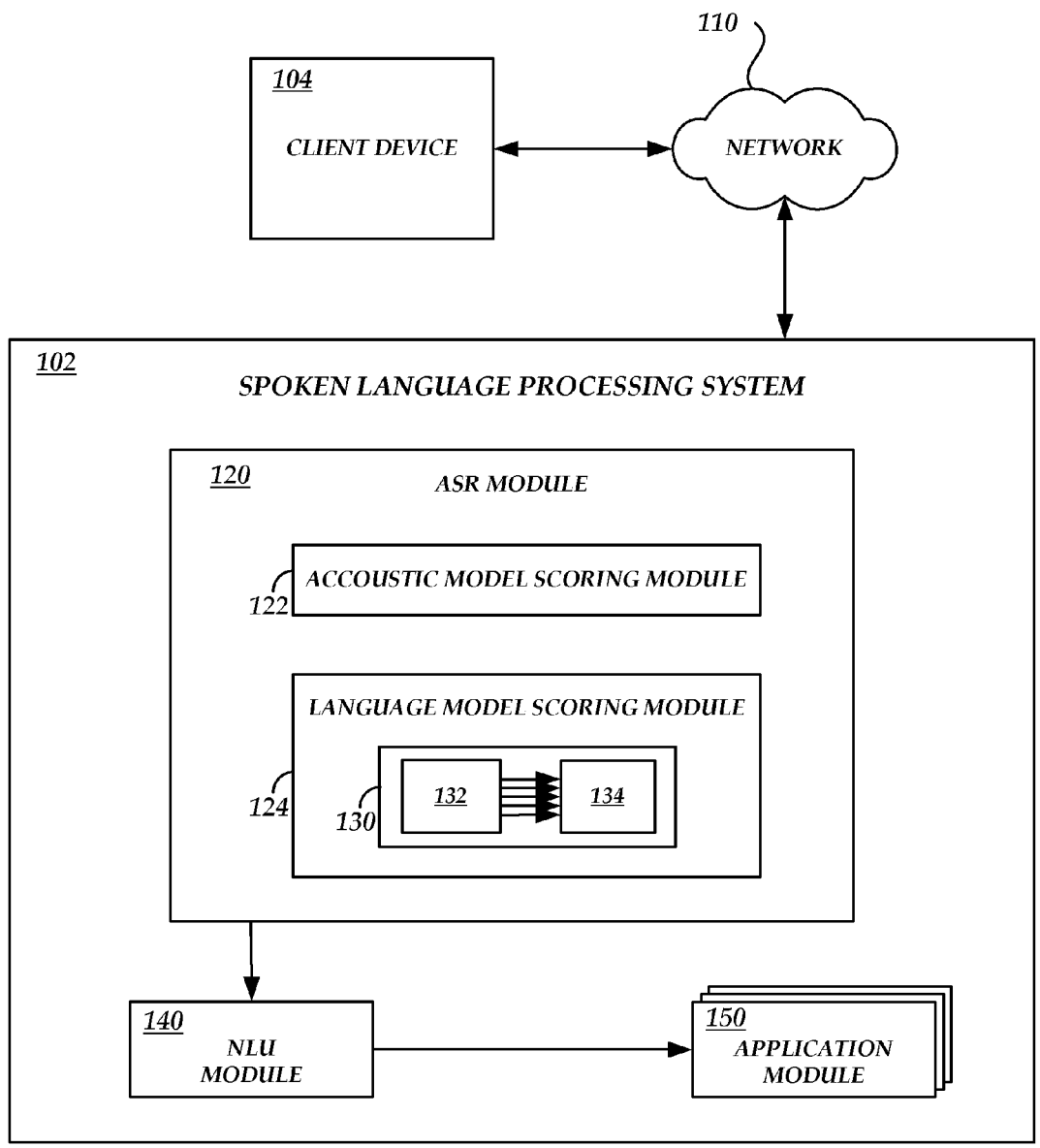
FIG. 2 is a block diagram of an illustrative computing environment in which the features of the present disclosure may be implemented, including a client device and a remote spoken language processing system.

FIG. 2 illustrates an example spoken language processing system 102 and a client device 104. The spoken language processing system 102 can be a network-accessible system in communication with the client device 104 via a communication network 110, such as a cellular telephone network or the Internet. A user may use the client device 104 to submit utterances, receive information, and initiate various processes, either on the client device 104 or at the spoken language processing system 102. For example, the user can issue spoken commands to the client device 104 in order to get directions, listen to music, query a data source, dictate a document or message, or the like.

The client device 104 can correspond to a wide variety of electronic devices. In some embodiments, the client device 104 may be a computing device that includes one or more processors and a memory which may contain software applications executed by the processors. The client device 104 may include a microphone or other audio input component for accepting speech input on which to perform speech recognition. The software of the client device 104 may include components for establishing communications over wireless communication networks or directly with other computing devices. Illustratively, the client device 104 may be a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

The spoken language processing system 102 can be any computing system that is configured to communicate via a communication network. For example, the spoken language processing system 102 may include any number of server computing devices, desktop computing devices, mainframe computers, and the like. In some embodiments, the spoken language processing system 102 can include several devices physically or logically grouped together, such as an application server computing device configured to perform speech recognition on an utterance and a database server computing device configured to store records and speech recognition models.

The spoken language processing system 102 can include an ASR module 120, an NLU module 140, and one or more application modules 150. In some embodiments, the spoken language processing system 102 can include various modules and components combined on a single device, multiple instances of a single module or component, etc. For example, the spoken language processing system 102 may include a separate database server that may be configured with a data store for ASR models, NLU models, user data, etc.; a server or group of servers configured with both ASR and NLU modules 120, 140; and a server or group of servers configured with applications 150. In multi-device implementations, the various devices of the spoken language processing system 102 may communicate via an internal communication network, such as a corporate or university network configured as a local area network ("LAN") or a wide area network ("WAN"). In some cases, the devices of the spoken language processing system 102 may communicate over an external network, such as the Internet, or a combination of internal and external networks.

In some embodiments, the features and services provided by the spoken language processing system 102 may be implemented as web services consumable via a communication network 110. In further embodiments, the spoken language processing system 102 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 110 may be a publicly accessible network of linked networks, possibly operated by various distinct parties, such as the Internet. In other embodiments, the network 110 may include a private network, personal area network ("PAN"), LAN, WAN, cable network, satellite network, etc. or some combination thereof, each with access to and/or from the Internet. For example, the devices of the spoken language processing system 102 may be located within a single data center, and may communicate via a private network as described above. The client device 104 may communicate with spoken language processing system 102 via the Internet. The client device 104 may have access to the Internet via a wired or WiFi connection, or via a cellular telephone network (e.g., a Long Term Evolution or LTE network).

In some embodiments, the ASR module 120, either alone or in combination with other spoken language processing system modules and components, may be physically located on a client device 104. For example, a client device 104 may include an integrated ASR module 120 or spoken language processing system 102 such that no network access is required in order to use some or all of its features. As another example, a portion of ASR processing or other spoken language processing system 102 functionality may implemented on a client device 104, and other spoken language processing system components and features may be accessible via a communication network.

ASR Processing with a Combined Language Model

Figure 3:
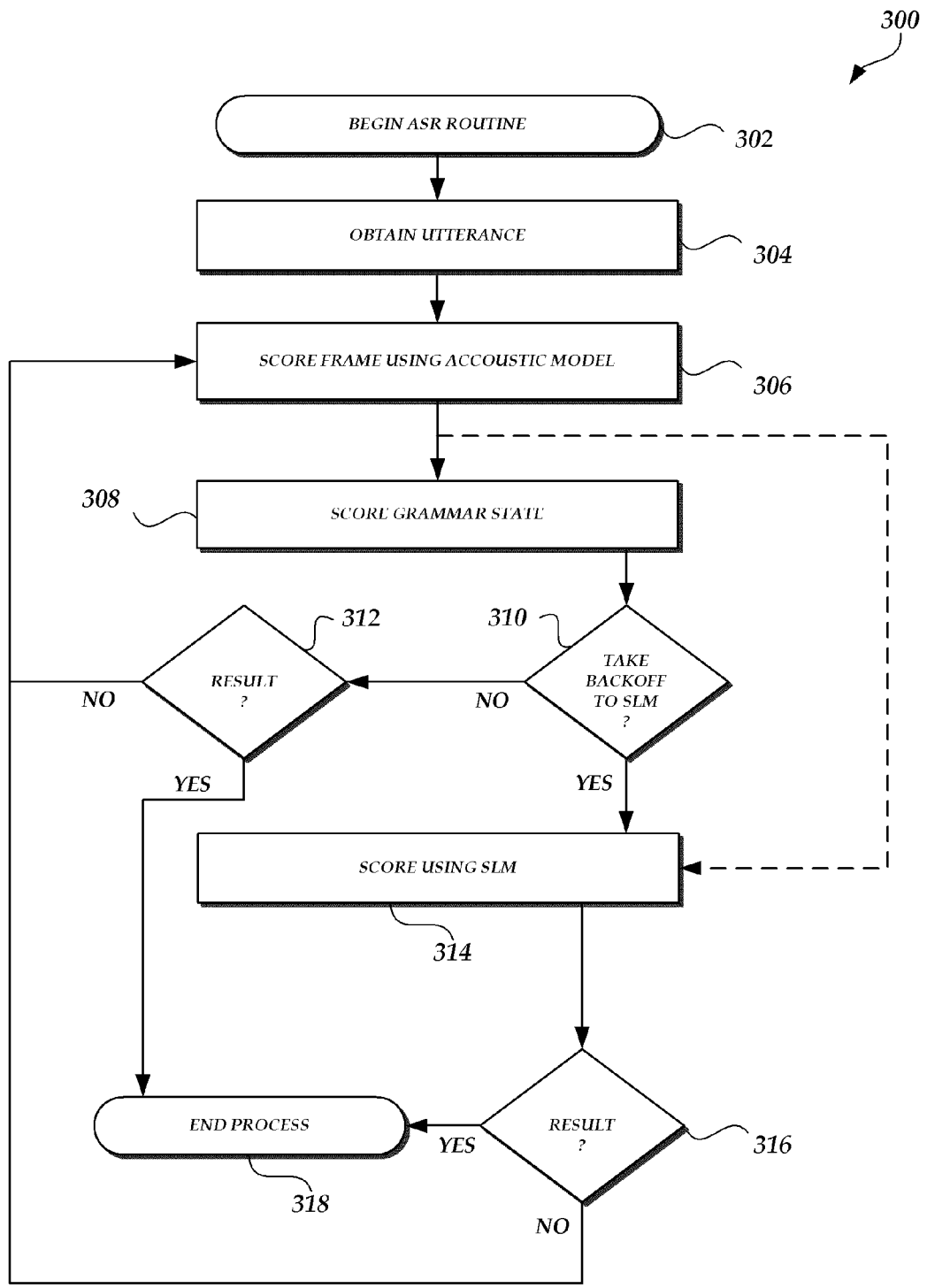
FIG. 3 is a flow diagram of an illustrative process for performing speech recognition with a combined grammar and statistical language model.

With reference now to FIG. 3, a sample process 300 for performing ASR using a combined language model will be described. Advantageously, an ASR module 120 (or some other module or component of a spoken language processing system 102) performing the process 300 can use a combined language model that combines a grammar and an SLM, thereby achieving the benefits of grammars (e.g., efficient recognition of predefined word sequences relevant to a particular domain) while also leveraging the broad search space of an SLM to add robustness to the processing (e.g., when a user deviates from the predefined word sequences.)

The process 300 begins at block 302. The process 300 may be embodied in a set of executable program instructions stored on a computer-readable medium, such as one or more disk drives, of a computing system of the spoken language processing system 102. When the process 300 is initiated, the executable program instructions can be loaded into memory, such as RAM, and executed by one or more processors of the computing system.

At block 304, the ASR module 120 or some other module or component of the spoken language processing system 102 can obtain audio data of a user utterance. The audio data may be obtained in the form of a waveform file or stream, or some other audio file or stream. Illustratively, the utterance may relate to a command and control application. Such applications often use a well-defined set of commands that will be accepted, which makes them good candidates for grammars. However, any pausing, repeating, or changing spoken commands in the middle of an utterance can cause an ASR system to misrecognize the utterance or fail to return any results if the ASR system uses only a grammar. Combining a grammar with an SLM can provide robustness in such circumstances.

At block 306, ASR module 120 or some other module or component of the spoken language processing system 102 can score the audio data using an acoustic model. For example, feature vectors may be computed for frames of audio data, and the acoustic model scoring module 122 can score the feature vectors to generate subword units (e.g., phonemes, triphones) that correspond to the acoustic features of the utterance. In some embodiments, the acoustic model scoring model 122 can score a feature vector and the process 300 can proceed to block 308 on a frame-by-frame basis.

At block 308, the ASR module 120 or some other module or component of the spoken language processing system can begin language model scoring with a grammar of a combined language model 400 (e.g., for the first frame of an utterance) or continue scoring with the grammar if a backoff arc to the SLM has not yet been taken. FIG. 4 shows a simplified example of a combined language model 400. The combined language model 400 includes a grammar (states 1, 2, 3 and 4) and an SLM (states 5, 6 and 7) connected via backoff arcs represented by dashed lines. As shown, state of 1 of the grammar is connected to state 5 of the SLM via backoff arc 408; states 2 and 3 of the grammar are connected to state 6 of the SLM via backoff arcs 410 and 412; and state 4 of the grammar is connected to state 7 of the SLM via backoff arc 414. The illustrative grammar is configured to only recognize the sequence "AAB" (where "A" and "B" may be any words, and the sequence "AAB" is some command or other utterance relevant to a particular domain for which the grammar is generated). At each state of the grammar, a backoff arc to a corresponding state in the SLM is provided. For example, state 3 of the grammar represents the state reached after recognizing the sequence "AA." Backoff arc 412 links grammar state 3 with SLM state 6. As shown, SLM state 6 is the state reached after recognizing "A" and any number or sequence of additional words prior to "A," including multiple instances of "A." In some embodiments, as shown, states of the grammar may be linked to states of the SLM model in an n-to-1 relationship, wherein n is any positive integer. For example, a given state in the grammar may include a backoff arc to only 1 state in the SLM, but multiple states in the grammar may include backoff arcs to the same state in the SLM.

At decision block 310, the ASR module 120 can determine whether to take a backoff arc to the SLM. If so, the process 300 can proceed to block 314. Otherwise, the process 300 may proceed to block 312. The determination of whether to take a backoff arc to the SLM may be based on various factors. In some embodiments, each backoff arc may be associated with a probability, weight, or some other score. The branches of the grammar may also be associated with a probability, weight, or some other score. The ASR module 120 can use the acoustic evidence from the acoustic model scoring module 122 to determine whether a branch from the present state in the grammar likely corresponds to the next word of the utterance. The combination of the acoustic evidence and the grammar branch scores, in comparison with the combination of the acoustic evidence and the backoff arc score, can be used to determine whether to take the backoff arc. For example, the language model scoring module 124 can calculate a first score associated with taking a branch from the current grammar state to a subsequent state in the grammar, and a second score associated with taking the backoff arc to the SLM. The first score can be based on the acoustic evidence and the grammar branch probability, weight or score, and the second score can be based on the acoustic evidence and the backoff arc probability, weight, or score. If the first score exceeds a threshold, is greater than the second score, or if the second score falls below a threshold, then speech recognition using the grammar may continue. If the second score exceeds a threshold, is greater than the first score, or if the first score falls below a threshold, then speech recognition may proceed using the SLM. In some embodiments, the scores of the grammar state branches and backoff arcs may be biased such that the grammar will be preferred (e.g., the score for the backoff arc may be low in comparison with the grammar state branches). Even in such cases, when the acoustic evidence strongly indicates that a grammar state branch does not correspond to the next word of the utterance, the backoff arc is taken and the SLM is used to recognize the next word.

In some embodiments, the scores for the backoff arcs can be determined based on the number of branches from the current grammar state. The score may be determined in inverse proportion to the number of branches. For example, if there is adequate diversity with respect to the possible words that may be recognized from the current state (e.g., there are many branches from the current grammar state to other states in the grammar), the score associated with the backoff arc for the current grammar state may be set relatively low. Recognition should continue using the grammar unless it is clear that the next word does not correspond to one of the grammar sates. If there is a lack of diversity at the current grammar state (e.g., there are a small number of branches from the current grammar state to other states in the grammar), the score associated with the backoff arc for the current grammar state may be set higher. As a result, recognition can switch over to using the SLM unless it is clear that the next word corresponds to one of the small number of branches from the current grammar state.

Figure 5:
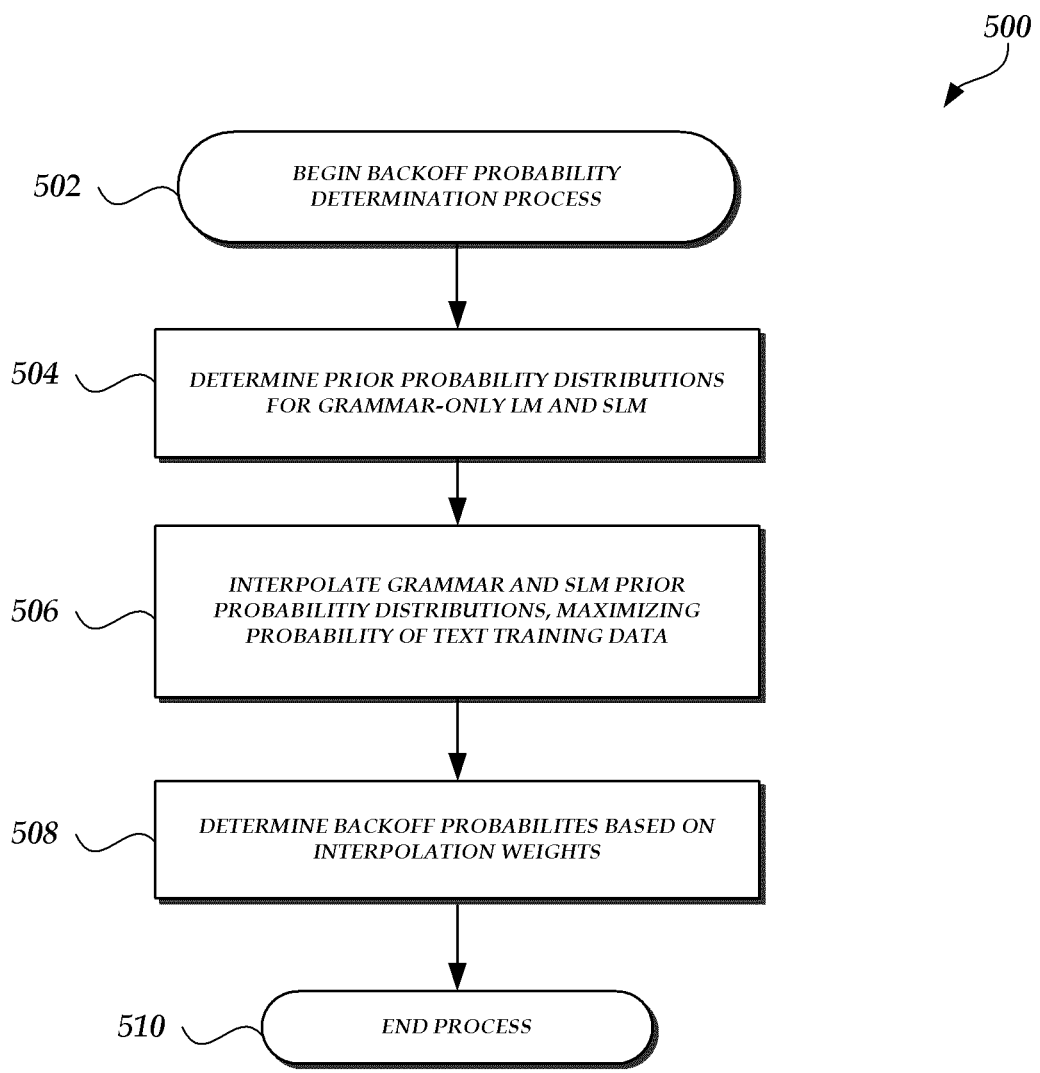
FIG. 5 is a flow diagram of an illustrative process for determining probabilities for backoff arcs of a combined language model.

In some embodiments, the scores assigned to the backoff arcs are not based on the number of branches from the current grammar state. Rather, the scores may be based on an interpolation of the SLM probability distribution and the grammar probability distribution. An example process 500 for determining scores for backoff arcs based on interpolation is illustrated in FIG. 5 and described in greater detail below. The example processes and methods described herein for determining backoff arc weights are illustrative only, and are not intended to be limiting. In some embodiments, other methods of determining scores for backoff arcs may be used.

In one example, prior results from the acoustic model scoring module 122 may have supported recognition of the word represented as "A" in FIG. 4. As a result, the current state of the grammar may be state 2, which is arrived at via the sequence "A." Subsequent results from the acoustic model 122 may support recognition of the word "A" again, which is also the next word in the grammar. In this example, even though there are a low number of branches (only 1) from the current grammar state 2, recognition proceeds to state 3 of the grammar in FIG. 4 and the process 300 proceeds to block 312.

At decision block 312, the ASR module 120 can determine whether the current state corresponds to a recognized result in the grammar. If so, the process 300 may end at block 318. If not, the process 300 may return to block 306 to where the next frame is scored using the acoustic model. In the present example, the state 3 is not the end of an utterance recognizable by the grammar, and therefore the process 300 returns to block 306, where the next feature vector corresponding to the next frame of utterance audio data is scored by the acoustic model scoring module 122.

Continuing the present example, the process 300 can proceed to block 308. The acoustic model scoring results may not support recognition of the word represented by the label "B" in FIG. 4, which is the only path from grammar state 3. Based on such information, the score associated with the backoff arc 410 from state 3, and/or other information, the backoff arc 412 may be taken and the process 300 may proceed to block 314.

At block 314, the ASR module 120 can score or recognize the utterance using the SLM portion 134 of the combined language model 130. As shown in FIG. 4, the backoff arc 412 from state 3 of the grammar leads to state 6 of the SLM. State 6 represents the recognition history for the current utterance, namely that state 6 is arrived at via the word represented by "A." The SLM supports recognition of the word "A" yet again, represented by the self-looping arc 418, such that the sequence "AAA" may be recognized. As shown, the sequence "AAA" is not a valid sequence recognizable by the grammar.

At decision block 316, the ASR module 120 can determine whether a result has been obtained. If so, the process 300 may terminate at block 318. Otherwise, the process 300 may return to block 306. After another feature vector is scored by the acoustic model scoring module 122 at block 306, the process 300 may return to block 314 (as represented by the dashed line in FIG. 3), because language model scoring has moved to the SLM.

In some embodiments, recognition may move back to the grammar after it has moved to the SLM. Due to the efficiency of using a grammar, an ASR module 120 may be biased to go back to the grammar, if possible, rather than stay in the SLM. Returning to the example above, language model scoring has moved to the SLM because three or more consecutive instances of "A" have been recognized, a sequence that is not recognizable by the grammar. In some cases, recognition may continue in the SLM for any number of frames, staying at state 6, moving to state 7 (e.g., by taking arc 426), moving back to state 6 (e.g., by taking arc 424), etc. At some point during language model scoring, such as when the current state is state 6, the language model scoring module 124 may move back to the grammar via arc 420 (indicated by a dotted line in FIG. 4). The language model scoring module 124 may do so when, e.g., the acoustic evidence indicates that the next word is likely a "B." Therefore, language model scoring can move from state 6 of the SLM, which is has a history of "A," to state 3 of the grammar, which also has a history of an "A" and has a branch, corresponding to "B," to state 4.

In some embodiments, the language model scoring module may require two or more consecutive words recognizable by a grammar in order to move back into the grammar from the SLM (e.g., to reduce the number of times recognition moves back and forth between the grammar and the SLM). In some embodiments, language model scoring may only return to the grammar at a state that is later than the state from which recognition moved to the SLM. In some embodiments, there may be multiple grammars. In such cases, recognition may only return to the grammar from which recognition moved to the SLM. Alternatively, if there are multiple grammar matches, then the language model scoring module 124 may choose the "closest" grammar match (in the topological sense), or may choose multiple grammar matches and score them in parallel.

Determination of Backoff Arc Probabilities

As described above, a score for a backoff arc of a particular grammar state may be inversely correlated with the number of branches from the grammar state to other grammar states. FIG. 5 illustrates another process 500 for determining probabilities or scores for the backoff arcs in a combined language model. In contrast to the heuristic-based approach described above, process 500 is based on the use of interpolation weights to determine scores for the backoff arcs.

The process 500 begins at block 502. The process 500 may be embodied in a set of executable program instructions stored on a computer-readable medium, such as one or more disk drives, of a computing system of the spoken language processing system 102. When the process 500 is initiated, the executable program instructions can be loaded into memory, such as RAM, and executed by one or more processors of the computing system.

At block 504, the spoken language processing system 102 or some other system or service can determine prior probability distributions for the grammar and the SLM to be combined. Techniques for determining prior probability distributions for SLMs are well known to those of skill in the art. With respect to grammars, prior probability distributions may be determined in a similar manner. For example, if there are 4 potential states that may be next after a given state (e.g., the given state has four branches extending therefrom), then probability distribution across those 4 potential branches may be determined. The path to the most likely state has the highest score, the path to the least likely state has the lowest score, etc. The probability may be set to zero for each remaining state in the grammar which may not come next.

At block 506, the spoken language processing system 102 or some other system or service can interpolate the grammar and SLM probability distributions associated with each pair of corresponding states (e.g., states 3 and 5 in FIG. 4). In some embodiments, a linear interpolation may be performed. The interpolation weights for the probability distributions associated with the grammar and SLM states may be optimized to minimize some parameter for a given task, domain, intent, etc. (e.g., the perplexity or WER) when using training data associated with the task, domain, intent, etc. The interpolation weights may be different from state to state, and therefore the backoff scores may be different from backoff arc to backoff arc. Backoff weights can be clustered using a set of features extracted from the grammar states. As an example, we can use diversity (branching factor) at each grammar state as a feature to introduce more than one backoff weight and then using the interpolation method we can estimate each of those weights. In some embodiments, textual data may be used to determine the optimal interpolation weights. In other embodiments, a combination of audio data and corresponding textual transcriptions may be used to determine the optimal interpolation weights.

At block 508, the spoken language processing system 102 or some other system or service can determine probabilities or scores for the backoff arcs. The probabilities may be based on the interpolation weights from the interpolations performed at block 506, above.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
      obtain audio data regarding an utterance of a user;
      initiate speech recognition on the audio data using a grammar of a composite language model, the composite language model comprising the grammar and an n-gram model, wherein the composite language model comprises scores that bias speech recognition performed using the composite language model to use the grammar over the n-gram model, and wherein a first state of the grammar links to a first state of the n-gram model and to a second state of the grammar;
      generate at least a first portion of automatic speech recognition results using a portion of the grammar up to at least the first state of the grammar;
      determine a first score using (1) acoustic information derived from the audio data and (2) a first weight associated with a link from the first state of the grammar to the second state of the grammar;
      determine a second score using (1) acoustic information derived from the audio data and (2) a second weight associated with a link from the first state of the grammar to the first state of the n-gram model;
      if the first score is greater than the second score, continue speech recognition on the audio data using the grammar by generating a second portion of automatic speech recognition results using the second state of the grammar, wherein the second portion of automatic speech recognition results is based at least in part on the first score;
      if the second score is greater than the first score, continue speech recognition on the audio data using n-gram model by generating the second portion of automatic speech recognition results using the first state of the n-gram model, wherein the second portion of automatic speech recognition results is based at least in part on the second score; and
      generate automatic speech recognition results based at least on the first portion of automatic speech recognition results and the second portion of automatic speech recognition results.

2. The system of claim 1 wherein a third score is associated with a link between a third state of the grammar and a second state of the n-gram model, and wherein the third score is different than the second score associated with the link between the first state of the grammar and the first state of the n-gram model.

3. The system of claim 1 wherein the one or processors are further configured to:
   determine to transition from a second state of the n-gram model to a third state of the grammar based at least on a word associated with the third state of the grammar; and
   further continue speech recognition on the audio data using the third state of the grammar.

4. The system of claim 1, wherein individual scores that bias speech recognition performed using the composite language model to use the grammar over the n-gram model comprise weighted scores computed using weighting factors, and wherein weighting factors for links from individual grammar states to individual n-gram model states are inversely proportional to a number of links from the individual grammar states to other grammar states.

5. The system of claim 1, wherein the acoustic information derived from the audio data comprises information regarding a word or subword unit of the utterance.

6. A computer-implemented method comprising:
   as executed by a spoken language processing system comprising one or more computing devices configured to execute specific instructions,
   obtaining audio data corresponding to an utterance;
   initiating speech recognition on the audio data using a grammar, wherein speech recognition using the grammar proceeds to at least a first state of the grammar, wherein the first state of the grammar is linked to a second state of the grammar and a first state of a statistical language model, and wherein individual links between the grammar and the statistical language model are configured to bias speech recognition to use the grammar over the statistical language model;
   determining a first score using (1) acoustic information regarding the utterance and (2) a first weight associated with a link from the first state of the grammar to the second state of the grammar;

determining a second score using (1) acoustic information regarding the utterance and (2) a second weight associated with a link from the first state of the grammar to the first state of the statistical language model;

if the first score is greater than the second score, continuing speech recognition on the audio data using the second state of the grammar; and if the second score is greater than the first score, continuing speech recognition on the audio data using the first state of the statistical language model.

7. The computer-implemented method of claim 6, wherein the statistical language model comprises an n-gram language model.

8. The computer-implemented method of claim 6, further comprising continuing speech recognition on the audio data using the grammar subsequent to continuing speech recognition using the statistical language model.

9. The computer-implemented method of claim 6, wherein the second score is based at least on an interpolation weight used to optimize an interpolation of a probability distribution of the grammar with a probability distribution of the statistical language model.

10. The computer-implemented method of claim 9, wherein the probability distributions are interpolated to optimize word error rate or perplexity.

11. The computer-implemented method of claim 6, wherein states of the grammar are linked to states of the statistical language model in an n-to-1 relationship, wherein n may be any positive integer.

12. The computer-implemented method of claim 6, further comprising:
obtaining second audio data corresponding to a second utterance;
performing speech recognition on the second utterance exclusively with the grammar.

13. The computer-implemented method of claim 6, wherein individual links between the grammar and the statistical language model configured to bias speech recognition to use the grammar over the statistical language model are associated with weighted scores computed using weighting factors, and wherein weighting factors for links from individual grammar states to individual statistical language model states are inversely proportional to a number of links from the individual grammar states to other grammar states.

14. The computer-implemented method of claim 6, wherein the acoustic information regarding the utterance comprises information regarding a word or subword unit of the utterance.

15. The computer-implemented method of claim 6, wherein determining the first score comprises applying the first weight to a first probability that the second state of the grammar corresponds to a portion of the utterance, and wherein determining the second score comprises applying the second weight to a second probability that the first state of the statistical language model corresponds to the portion of the utterance.

16. One or more non-transitory computer readable media comprising executable code that, when executed, cause one or more computing devices to perform a process comprising:
obtaining audio data corresponding to an utterance;
initiating speech recognition on the audio data using a grammar, wherein speech recognition using the grammar proceeds to at least a first state of the grammar, wherein the first state of the grammar is linked to a second state of the grammar and a first state of a statistical language model, and wherein individual links between the grammar and the statistical language model are configured to bias speech recognition to use the grammar over the statistical language model;

determining a first score and a second score, wherein the first score is determined using a weight associated with a link from the first state of the grammar to the second state of the grammar;

if the first score is greater than the second score, continuing speech recognition on the audio data using the second state of the grammar; and if the second score is greater than the first score, continuing speech recognition on the audio data using the first state of the statistical language model, wherein speech recognition using the statistical language model is based at least in part on a score associated with the correspondence between the first state of the grammar and the first state of the statistical language model.

17. The one or more non-transitory computer readable media of claim 16, the process further comprising continuing speech recognition on the audio data using the grammar subsequent to continuing speech recognition using the first state of the statistical language model.

18. The one or more non-transitory computer readable media of claim 16, wherein the second score is associated with the link between the first state of the grammar and the first state of the statistical language model, and wherein continuing speech recognition using the statistical language model is based at least in part on the second score.

19. The one or more non-transitory computer readable media of claim 18, wherein the second score is based at least on a number of branches from the first state of the grammar to other states of the grammar.

20. The one or more non-transitory computer readable media of claim 18, wherein the second score is based at least on an interpolation weight used to optimize an interpolation of a probability distribution of the grammar with a probability distribution of the statistical language model.

21. The one or more non-transitory computer readable media of claim 20, wherein the probability distributions are interpolated to optimize word error rate or perplexity.

22. The one or more non-transitory computer readable media of claim 16, the process further comprising:
obtaining second audio data corresponding to a second utterance;
performing speech recognition on the second utterance exclusively with the grammar.

23. The one or more non-transitory computer readable media of claim 16, wherein individual links between the grammar and the statistical language model configured to bias speech recognition to use the grammar over the statistical language model are associated with weighted scores computed using weighting factors, and wherein weighting factors for links from individual grammar states to individual statistical language model states are inversely proportional to a number of links from the individual grammar states to other grammar states.

24. The one or more non-transitory computer readable media of claim 16, wherein determining the first score comprises applying the weight to a probability that the second state of the grammar corresponds to a portion of the utterance.

* * * * *

UNITED STATES PATENT AND TRADEMARK OFFICE
CERTIFICATE OF CORRECTION

PATENT NO. : 9,449,598 B1
APPLICATION NO. : 14/037975
DATED : September 20, 2016
INVENTOR(S) : Ariya Rastrow Page 1 of 1

It is certified that error appears in the above-identified patent and that said Letters Patent is hereby corrected as shown below:

On the Title Page

Item (72), (Inventors) at Line 5, Change "Rohit Krishna Prasad" to --Rohit Prasad--.

In the Claims

In Column 14 at Line 14 (approx.), In Claim 1, after "using" insert --the--.

Signed and Sealed this
Tenth Day of April, 2018

Andrei Iancu
*Director of the United States Patent and Trademark Office*